US008702302B2

(12) United States Patent
Badami et al.

(10) Patent No.: US 8,702,302 B2
(45) Date of Patent: Apr. 22, 2014

(54) HOT GAS TEMPERATURE MEASUREMENT IN GAS TURBINE USING TUNABLE DIODE LASER

(75) Inventors: Vivek Venugopal Badami, Schenectady, NY (US); Scott Mordin Hoyte, Greenville, SC (US); Chayan Mitra, Karnataka (IN); Ayan Banerjee, Karnataka (IN)

(73) Assignee: General Electric Company, Schenectady, NY (US)

( * ) Notice: Subject to any disclaimer, the term of this patent is extended or adjusted under 35 U.S.C. 154(b) by 555 days.

(21) Appl. No.: 12/880,681

(22) Filed: Sep. 13, 2010

(65) Prior Publication Data
US 2012/0060510 A1 Mar. 15, 2012

(51) Int. Cl.
*G01K 7/00* (2006.01)
(52) U.S. Cl.
USPC .......................................... 374/131; 374/120
(58) Field of Classification Search
USPC ................................................. 374/131, 120
See application file for complete search history.

(56) References Cited

U.S. PATENT DOCUMENTS

| | | | | |
|---|---|---|---|---|
| 3,584,509 | A | * | 6/1971 | Compton et al. ............. 374/123 |
| 3,778,170 | A | | 12/1973 | Howell et al. |
| 4,659,195 | A | | 4/1987 | D'Amelio et al. |
| 4,980,763 | A | | 12/1990 | Lia |
| 5,445,964 | A | * | 8/1995 | Lee et al. ......................... 436/60 |
| 5,813,767 | A | * | 9/1998 | Calabro' et al. .............. 374/142 |
| 5,993,194 | A | | 11/1999 | Lemelson et al. |
| 6,356,350 | B1 | * | 3/2002 | Silver et al. .................... 356/437 |
| 6,473,705 | B1 | | 10/2002 | Conners |
| 7,075,653 | B1 | | 7/2006 | Rutherford |
| 2002/0158202 | A1 | * | 10/2002 | Webber et al. ............ 250/339.13 |
| 2004/0000643 | A1 | * | 1/2004 | Karlsson ................... 250/339.13 |
| 2004/0179575 | A1 | * | 9/2004 | Markham ....................... 374/121 |
| 2004/0191712 | A1 | * | 9/2004 | Thomson et al. ................ 431/12 |
| 2005/0191755 | A1 | | 9/2005 | Balbach |
| 2006/0133714 | A1 | | 6/2006 | Sappey et al. |
| 2006/0176486 | A1 | * | 8/2006 | Ho ................................. 356/436 |
| 2008/0123712 | A1 | * | 5/2008 | Zhou et al. ....................... 372/55 |

(Continued)

FOREIGN PATENT DOCUMENTS

| | | |
|---|---|---|
| DE | 27 30 508 | 1/1979 |
| EP | 1 205 736 A2 | 5/2002 |

(Continued)

OTHER PUBLICATIONS

"Tunable Diode Laser Absorption Spectroscopy", Wikipedia, printed Jul. 26, 2011, pp. 1-6.

*Primary Examiner* — Mirellys Jagan
(74) *Attorney, Agent, or Firm* — Nixon & Vanderhye P.C.

(57) ABSTRACT

A combustion gas measurement apparatus mounted in a gas turbine including: a tunable laser generating a radiation beam passing through a combustion gas path; a controller tuning the laser to emit radiation having at least a first selected wavelength and a second selected wavelength which both correspond to temperature-dependent transitions of a combustion species of the gas, wherein the first selected wavelength and the second selected wavelength are not near absorption peaks of neighboring wavelengths; a detector sensing the radiation beam passing through the combustion gas and generating an absorption signal indicative of an absorption of the beam by the combustion gas at each of the first wavelength and the second wavelength, and a processor executing a program stored on a non-transitory storage medium determining a combustion gas temperature based on a ratio of the adoption signals for the first wavelength and the second wavelength.

9 Claims, 6 Drawing Sheets

(56) References Cited

U.S. PATENT DOCUMENTS

| | | | |
|---|---|---|---|
| 2009/0164138 A1* | 6/2009 | Goto et al. | 702/24 |
| 2010/0292906 A1* | 11/2010 | Girouard et al. | 701/100 |
| 2011/0128989 A1* | 6/2011 | Li et al. | 374/131 |
| 2011/0150035 A1* | 6/2011 | Hanson et al. | 374/161 |
| 2011/0154806 A1* | 6/2011 | Hoyte et al. | 60/276 |

FOREIGN PATENT DOCUMENTS

| | | |
|---|---|---|
| JP | 2004-204787 | 7/2004 |
| WO | 00/28304 A1 | 5/2000 |
| WO | 2004/090496 A2 | 10/2004 |

* cited by examiner

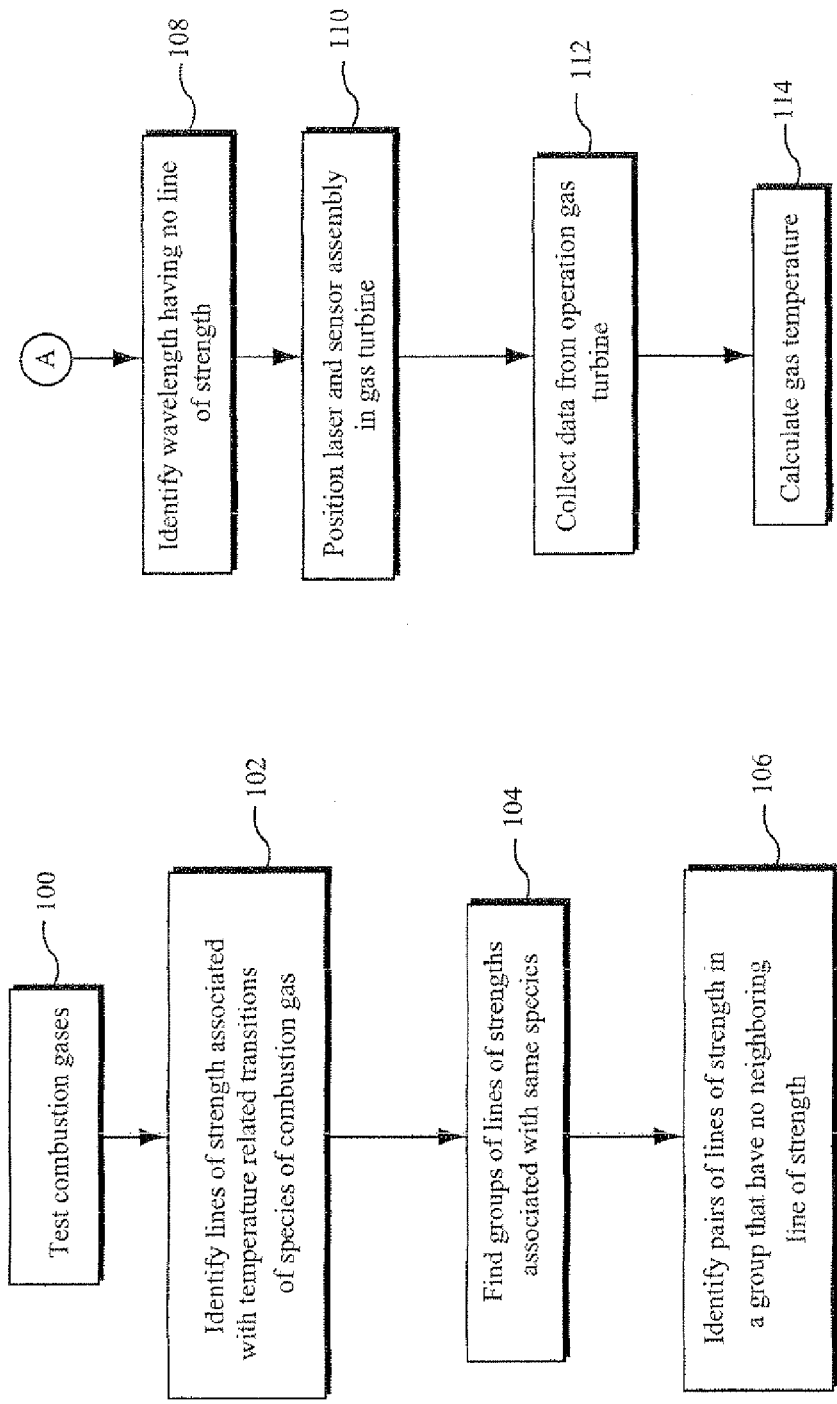

HOT GAS TEMPERATURE MEASUREMENT IN GAS TURBINE USING TUNABLE DIODE LASER

BACKGROUND OF THE INVENTION

The invention relates to determining hot gas temperatures using a tunable laser, and particularly to determining high pressure, combustion gas temperatures in a gas turbine.

Combustion gas temperature in a gas turbine is difficult to determine accurately. The combustion gas is extremely hot, corrosive, turbulent and at a high pressure. Combustion gas temperature, e.g., turbine firing temperature (Tfire), is conventionally estimated based on factors such as exhaust gas temperature and compressor discharge gas pressure. This estimation of combustion gas temperature has a certain level of uncertainty. To compensate for this uncertainty, the combustion gas temperature is set at a temperature lower than would be needed if the combustion temperature where known to a greater uncertainty.

Combustion gas temperature affects the power output of a gas turbine. Power increases as the combustion gas temperature is increased. For example, increasing combustion gas temperature (Tfire) by 10 degrees Fahrenheit may increase power output by one megawatt (1 MW) for a two-hundred megawatt (200 MW) gas turbine. Reducing the uncertainty level should allow combustion gas temperature to be increased and yield a corresponding increase in power output of a gas turbine.

Spectroscopic measurements, e.g., laser measurements, have been proposed to accurately determine gas temperatures in a gas turbine. International Patent Application WO 2007/014960 describes a temperature measurement device measures absorption of laser light at wavelengths corresponding to oxygen in a combustion gas flow of a gas turbine. U.S. Patent Application Publication 2008/0289342 describes determining combustion temperatures by measuring absorption of laser light wavelengths corresponding to oxygen in the gas flow of a gas turbine.

The laser wavelengths at which to measure absorption due to the combustion gas should be selected to optimize the accuracy of calculation of the gas temperature. The wavelengths at which the absorption is measured are conventionally selected as corresponding to temperature-dependent transitions of a species in the gas. There are several available wavelengths at which absorption occurs due to temperature-dependent transitions of a combustion gas species. A method is needed to select a pair of wavelengths at which laser absorption is to be measured to obtain absorption line strength data for accurately calculating combustion gas temperature in a gas turbine.

BRIEF DESCRIPTION OF THE INVENTION

A system and method for accurately measuring the firing temperature or other hot gas temperatures in a gas turbine has been developed. A tunable diode laser directs a laser beam through the combustion gases flowing through a gas turbine. Radiation sensors measure the radiation absorption occurring at wavelengths corresponding to a pair of water vapor overtone transitions in the near-infrared wavelength band. The temperature of the combustion gases is calculated based on a ratio of the measured absorptions at these two wavelengths. The pair of wavelengths are relatively isolated and have no neighboring strong lines of absorption at nearby wavelengths. The isolation and lack of neighboring lines of absorption strength avoids the merging of neighboring strong lines of absorption strength that occurs at the high pressures in a gas turbine.

A combustion gas measurement apparatus mounted in a gas turbine, the measurement apparatus including: a tunable laser generating a radiation beam passing through a combustion gas path in the gas turbine; a controller for the tunable laser and tuning the laser to emit radiation having at least a first selected wavelength and a second selected wavelength which both correspond to temperature-dependent transitions of a combustion species of the gas, wherein the first selected wavelength and the second selected wavelength are not near absorption peaks of neighboring wavelengths; a detector sensing the radiation beam passing through the combustion gas and generating an absorption signal indicative of an absorption of the beam by the combustion gas at each of the first wavelength and the second wavelength, and a processor executing a program stored on a non-transitory storage medium determining a combustion gas temperature based on a ratio of the adoption signals for the first wavelength and the second wavelength.

A combustion gas measurement apparatus mounted in a gas turbine, the measurement apparatus comprising: a tunable diode laser emitting a laser beam passing through a combustion gas path in the gas turbine; a controller for the tunable diode laser tuned to emit a first laser beam at a wavelength of 1334 nanometers (nm) and a second laser beam at a wavelength of 1380 nm or 1391 nm; the laser beam to emitting the laser beam at the 1334 nm wavelength and the 1380 nm or 1391 nm; a laser sensor sensing each of the radiation beams passing through the combustion gas and generating an absorption signal indicative of an absorption of the beam by the combustion gas at each of wavelengths, and a processor executing a program stored on a non-transitory storage medium determining a combustion gas temperature based on a ratio of the adoption signals for the first laser beam and the second laser beam.

A method to calculate a combustion gas temperature in a high pressure environment, the method comprising: identifying strong lines of strength associated with temperature related transitions of species in the combustion gas; identifying the strong lines of strength that are associated with a temperature depended transition of a combustion species of the combustion gas; selecting a first and second of the strong lines of strength identified as being associated with the combustion species, wherein the selected two of the strong lines of strength have no neighboring strong lines of strength; identifying a first wavelength and a second wavelength each associated, respectively, with the first and the second of the strong lines; projecting a laser beam through a combustion gas path at each of the identified first and second wavelengths and collecting data regarding absorption of the beam by the combustion gas at each of the identified first and second wavelengths, and calculating a combustion gas temperature using the collected data.

BRIEF DESCRIPTION OF THE DRAWINGS

FIGS. 9 and 10 are a process chart illustrating an exemplary method for determining combustion temperature using a tunable diode laser.

DETAILED DESCRIPTION OF THE INVENTION

Figure 1:
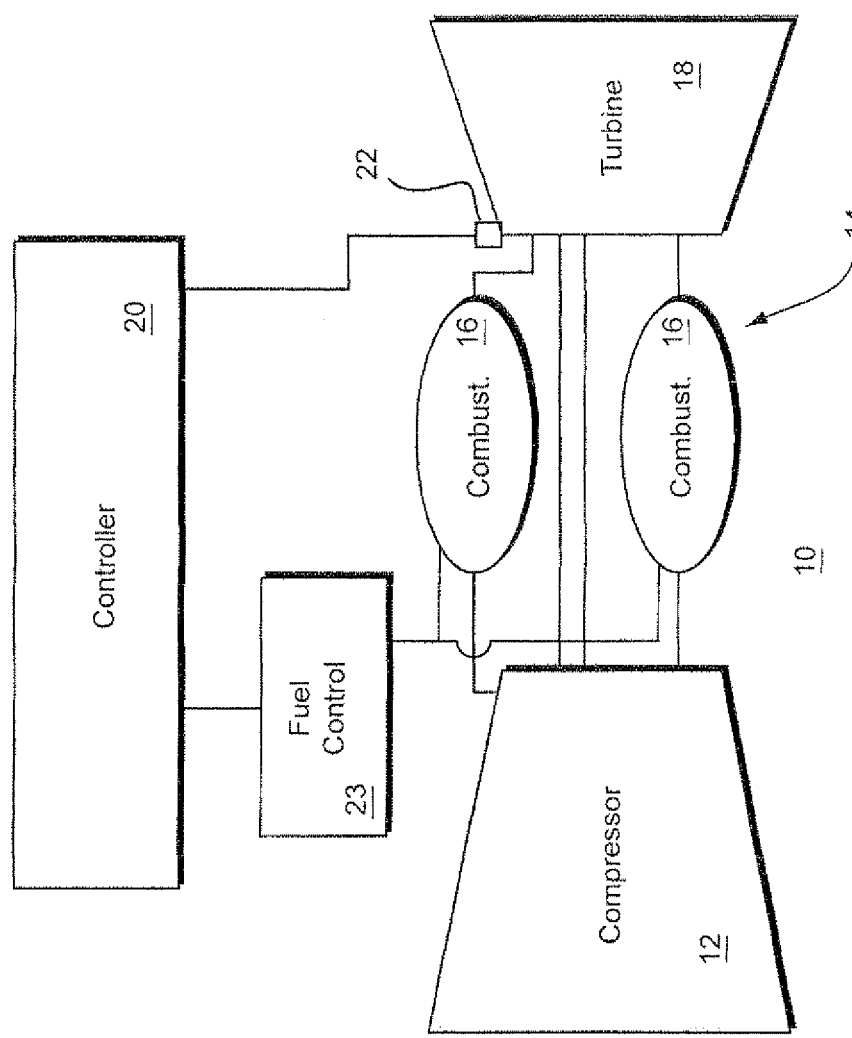
FIG. 1 is a schematic diagram of a gas turbine.

FIG. 1 is a schematic diagram of an industrial gas turbine engine 10 having a compressor 12, combustor 14 with combustion cans 16 and a turbine 18. Air enters the axial compressor 12 which pressurizes and discharges the air to an annular array of combustion cans 16 that form the combustor. The air and fuel mixture are ignited in the combustion cans and hot gases formed by the combustion flow into the turbine 18. The hot combustion gases 15 enter the turbine 16 and flow over an annular array of first stage stator blades and an annular array of first stage turbine buckets. The flow of hot combustion gas flow over the rows of annular arrays turbine buckets, rotate the turbine buckets and associated shaft which is also connected to the compressor. The rotation of the compressor by the turbine causes the compressor to pressurize the air for the combustor.

The temperature of the hot combustion gases entering the turbine is conventionally referred to as the firing temperature (Tfire). The firing temperature may be defined as the gas temperature where turbine work begins, such as in the combustion gas flow path at the trailing edge of the first stator and the leading edge of the first turbine bucket.

A controller 20, e.g., a computer with a non-transitory storage medium and a processor, receives wavelength absorption data from a laser and sensor assembly 22 which is used to calculate a combustion gas temperature. The controller uses the calculated combustion gas temperature to control the gas turbine, such as by adjusting the fuel control 23 and inlet guide vanes to the compressor 12. The controller also outputs data regarding the performance of the gas turbine using the calculated combustion gas temperature.

Figure 2:
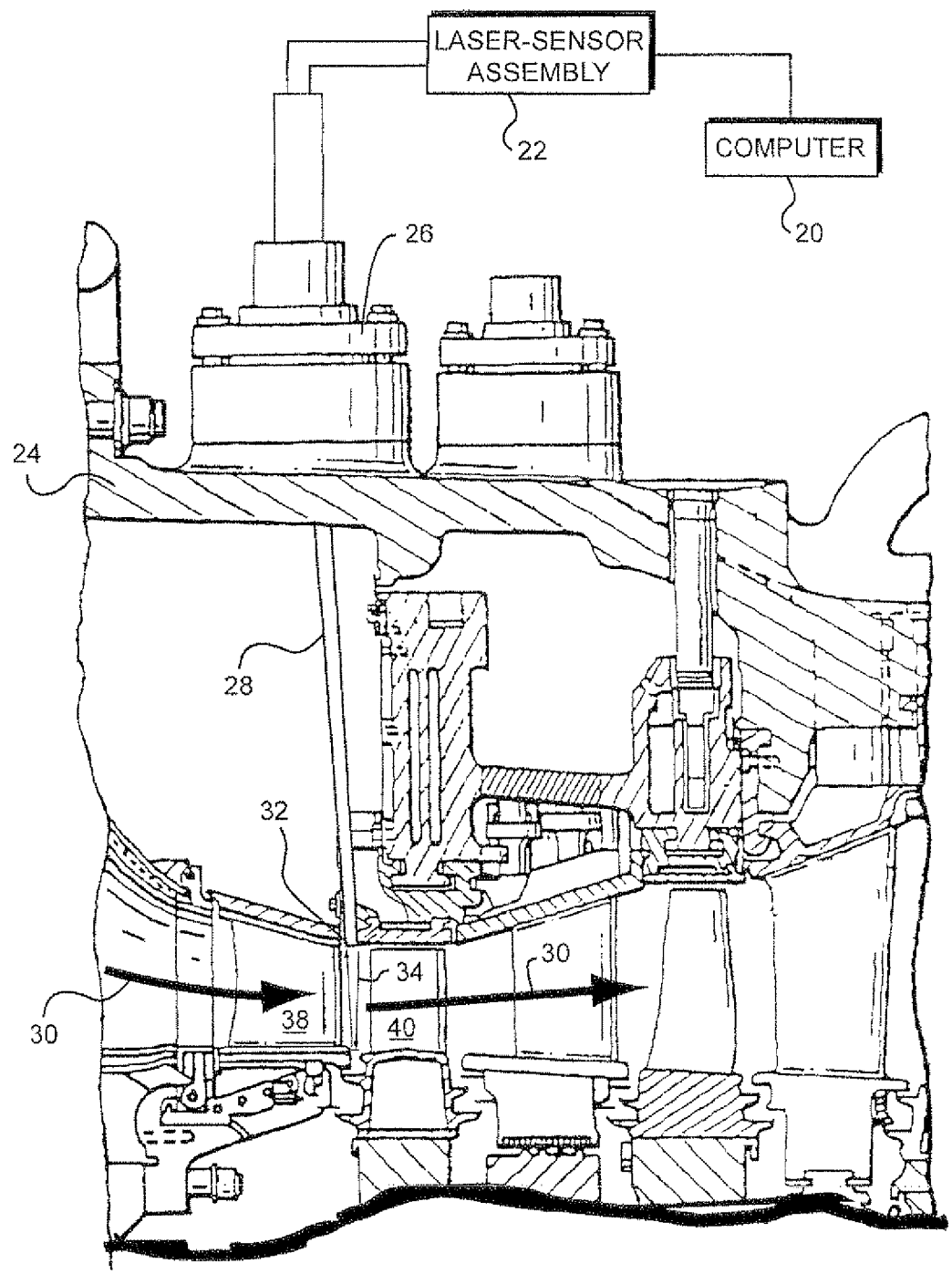
FIG. 2 is a cross-section of the junction between the combustor and turbine of the gas turbine shown in FIG. 1.

FIG. 2 is a cross-sectional diagram of an enlarged section of the gas turbine 10 corresponding to the inlet to the turbine 16, which is proximate to the trailing edge of the first row of stators and the leading edge of the first row of turbine buckets. The casing 24 of the gas turbine 10 has ports 26 that are conventionally used to insert boroscopes to inspect the internal components, e.g., turbine buckets and stators, of the gas turbine.

The ports 26 provide access the laser and laser sensor assembly 22 that monitors combustion gases flowing from the combustor to and through the turbine. The laser and sensor assembly 22 is mounted on or in the casing 24 of the gas turbine and extends through a borehole port 26. A shaft 28 of the laser and sensor assembly 22 extends through one of the ports 26 on the casing and to the outer periphery of the gas flow path 30.

Within the shaft 28 are light paths, e.g., fiber optics, or electrical wires to carry laser light or electrical signals between the inner tip 32 of the shaft and electronic control and sensing circuits associated with the laser and sensor assembly 22. The tip 32 may include a laser diode and a diode sensor each connected to electrical signal wires. The laser diode projects a beam of radiation 34 that passes through the combustion gas flow path 30. The diode sensor receives the beam 34 after it passes through the gas flow path and generates a signal indicating the strength, e.g., intensity, of the beam.

The 32 tip may be aligned with a narrow gap between the first stator 38 and the first turbine bucket 40 and at the outer periphery of the flow path 30 through that gap. Laser light 34 is projected radially inward through the flow path and reflects of an radially inward surface adjacent the flow path back to a radiation detector, e.g., an optical sensor or fiber optic, at the tip 32. The laser light 34 may be reflected from the shaft of the turbine.

Rather than reflecting the laser light, a pair of shafts 28 may be inserted at different borescope ports 26, which may be aligned axially on the casing 24 of the gas turbine, and positioned such that the tip 32 of each shaft is along a light of sight that extends through the gas path. Laser light 34 is projected from a first tip and a light detector or light capturing device, e.g., a fiber optic, is in the other tip. Further, multiple shafts 28 (or pairs of shafts) may extend through different bore-scope ports or other openings in the casing of the gas turbine to monitor the gas temperature at various locations in the gas flow path.

A tunable diode laser and sensor assembly 22 may be a conventional system having tunable diode laser light source; transmitting, e.g., beam shaping, optics; laser beam receiving optics and a detector(s), such as a photodiode. The laser diode is tuned by electronic circuits and a computer controller associated with the assembly 22 to vary the radiation emission wavelength of the laser over wavelengths characteristic to the absorption wavelengths of certain combustion species of the combustion gas, such as water vapor.

The absorption of the radiation emission from the laser reduces the intensity of the laser beam and the reduction in intensity is measured by the detector. The detector generates a line strength signal indicating the amount of absorption of the radiation at the wavelength emitted by the laser. The line strength signal is output to a computer 20 or other processing unit, which uses the signal to determine the combustion gas temperature. The computer 20 may be separate from or combined with the computer that tunes the laser in the laser assembly 22.

A tunable diode laser is a laser in which the frequency of the output radiation can be tuned over part or all of the ultraviolet, visible, and infrared regions of the spectrum. The tunable diode laser may be selected based on the wavelength the range over which tuning is to be performed. Typical examples of diode lasers are InGaAsP/InP (tunable over 900 nm to 1.6 μm) and InGaAsP/InAsP (tunable over 1.6 μm to 2.2 μm). Diode lasers may be tuned by adjusting their temperature or injection current density injected into the gain medium of the laser.

The light sensor(s) for the laser and sensor assembly 22 measures the radiation absorption at the various wavelengths emitted as the laser is tuned, using conventional absorption spectroscopy techniques. As the laser radiation, e.g., light, passes through the combustion gas, the combustion species in the gas absorb certain wavelengths of the radiation. Further, the temperature of the gas affects the amount of absorption that occurs.

Measuring the laser radiation absorption at selected wavelengths provides data useful in calculating the temperature of the combustion gas. In particular, the temperature of a gas can be inferred from the ratio of the absorption of laser radiation measured at two wavelengths, each corresponding to temperature-dependent transitions of a component (species) of the gas.

The selected wavelengths of the laser radiation correspond to wavelengths of water vapor transitions occurring in the combustion gas. The line strengths are measured at these two selected wavelengths based on the laser radiation passing through the compressed combustion gas flowing through the gas turbine. The absorption line strengths are measured at the two selected wavelengths substantially simultaneously as the laser diode is tuned to alternatively radiate at each of the selected wavelengths.

The ratio of the two absorption line strengths is used, in a conventional manner, to calculate the temperature of the combustion gas. Tunable diode laser absorption spectroscopy (TDLAS) techniques may be used to measure the absorption line strengths and calculate the combustion gas temperature. In particular, the wavelengths are selected to correspond to two water vapor overtone transitions in the near-infrared band. The temperature of the combustion gases can be calculated based on a ratio of the measured absorption of the wavelengths corresponding to two water vapor overtone transactions.

The wavelengths at which absorption is measured to determine combustion gas temperature are selected such that they correspond to absorption by water vapor and have no nearby wavelengths at which absorption peaks. Selecting wavelengths distant from other absorption peak wavelengths ensures that the selected wavelength does not merge with a neighboring adoption peak as the gas pressure increases.

For applications in internal combustion (IC) engines, such as gas turbines, variable pressure broadening (collisional broadening) complicates absorption measurement and introduces varying degrees of overlap of absorption transitions with neighboring transitions. The collisional broadening of a typical water vapor transition is $\gamma_{air}$ is about 0.05 cm-1/atm at 300K. If the candidate laser wavelength has a neighboring transition within 2.5 cm-1, there will be significant overlap at the high combustion pressures in an IC. The degree of overlap (interference) depends on the relative line strengths during the P/T cycles of the engine. The simplest line selection process would only retain lines which have no nearest neighbors within 2.5 cm-1.

Figure 3:
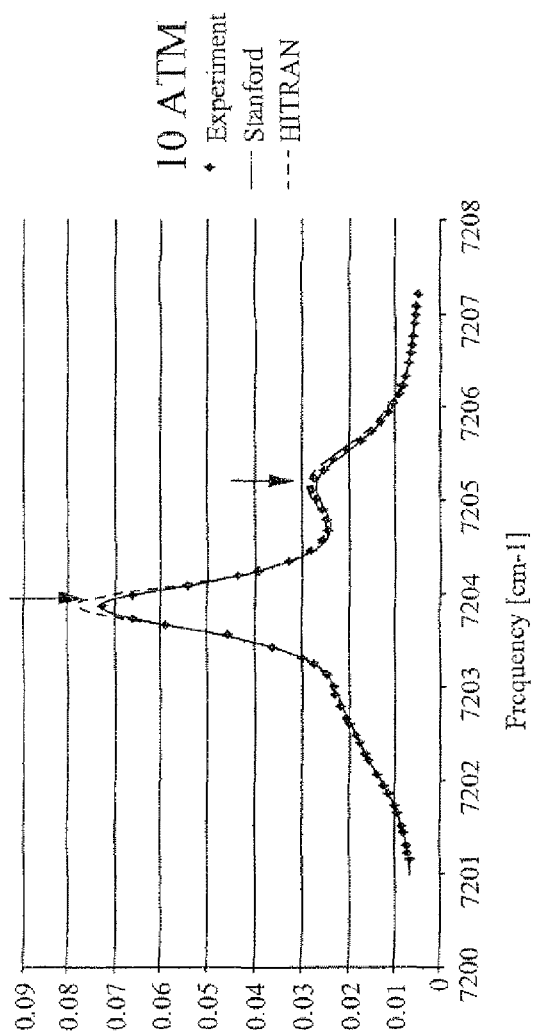
FIGS. 3 and 4 are charts showing laser radiation absorption by combustion gas for a range of radiation frequencies from 7200/cm to 7207/cm wavelengths.
Figure 4:
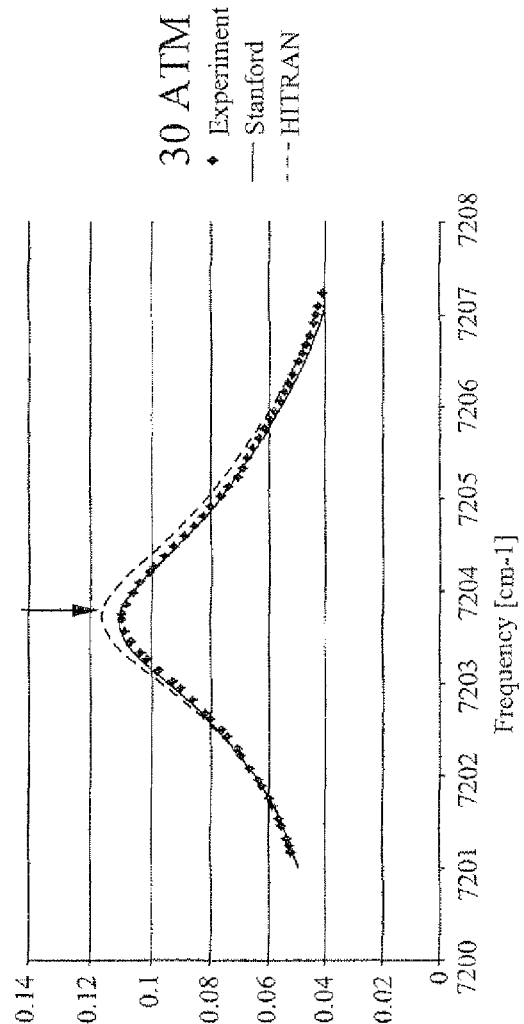

FIGS. 3 and 4 are charts showing laser radiation absorption by combustion gas for a range of radiation frequencies from 7200/cm to 7207/cm wavelengths. As shown in FIG. 3, a strong absorption line (peak) occurs at 7204/cm (corresponding to a wavelength of 1388 nanometers (nm)) and a nearby smaller line occurs at 7205/cm when the gas pressure is at 10 atmospheres (ATM). FIG. 4 shows that, as the gas pressure rises to 30 ATM, the two absorption lines spread and merge. The merging of absorption lines as gas pressure increases degrades the measurement accuracy of the absorption due to just one of the absorption lines.

For a typical Tfire measurement in a gas turbine, the combustion pressure is about fifteen atmospheres (15 atm). The collision broadening of a typical water vapor transition is $\gamma_{air}$ at approximately 0.05 cm-1/atm at 300K. At 15 atm, the full-width, half maximum (FWHM) for a water vapor transition will change by 0.75 cm-1. This will not lead to any merger of lines at high pressure.

Figure 5:
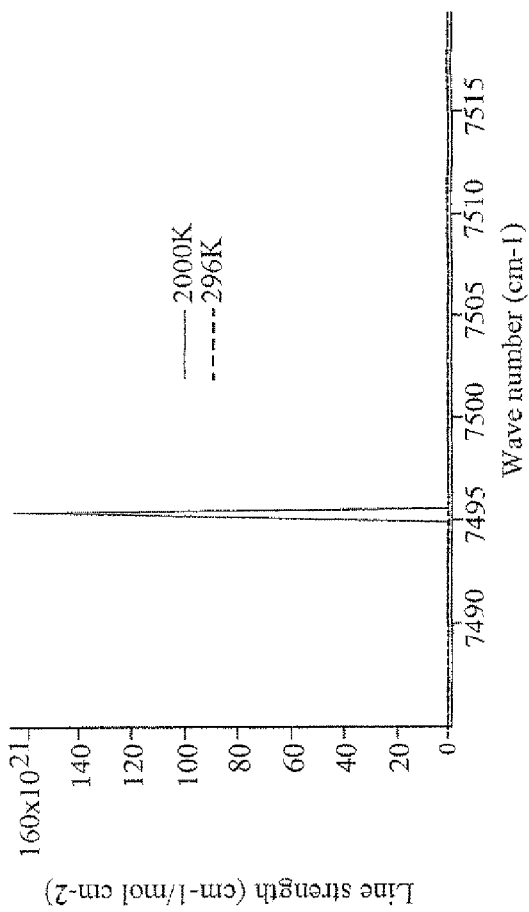
FIGS. 5 and 6 are exemplary charts showing line strength for laser absorption by combustion gases at various wavelengths.
Figure 6:
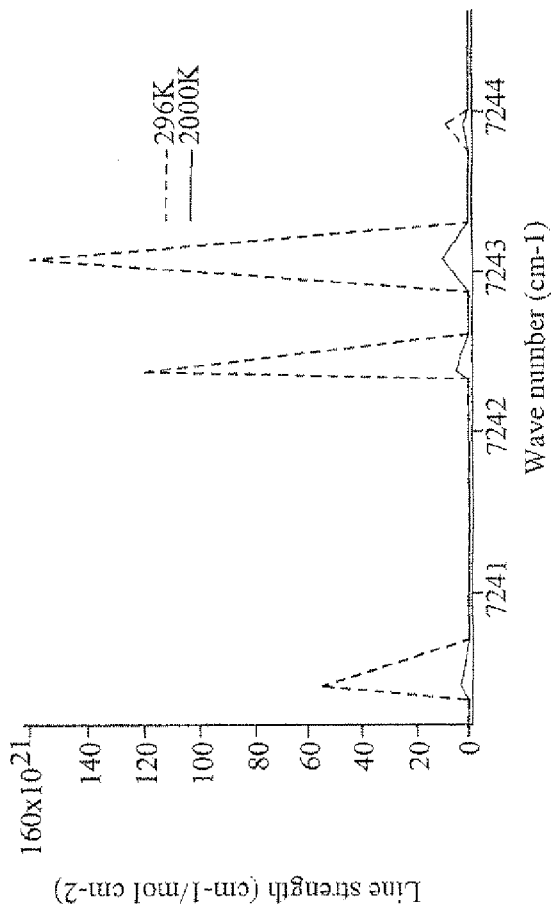

FIGS. 5 and 6 are exemplary charts showing line strength for laser absorption by combustion gases at various wavelengths. The pressure of the gas is 1 atmosphere (atm) for the example shown in FIGS. 5 and 6. FIG. 5 shows a strong line of absorption at a wavelength of 7495/cm (1334 nm) and a temperature of 2000 Kelvin (K) (1727° C. and 3140.6° F.). There are no neighboring wavelengths having a line of absorption in the range of 7490/cm to 7515/cm. FIG. 6 shows a strong line of absorption at a wavelength of 7243/cm (1380 nm).

The pairs of wavelengths (i) 7495/cm (1334 nm) and 7243/cm (1380 nm) and (ii) 7495/com and 7185/cm (1391 nm) correspond to water vapor overtone transitions in the near-infrared and have no neighboring lines of absorption to cause interference.

Figure 7:
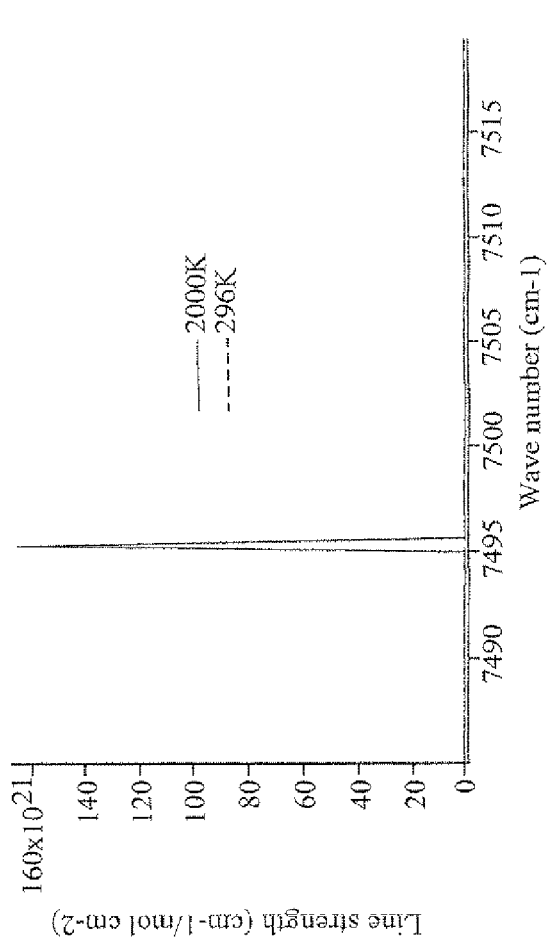
FIGS. 7 and 8 are exemplary charts showing line strength for laser absorption by combustion gases at various wavelengths.

FIG. 5 shows negligible line strength at ambient temperature (296K) which indicates that ambient temperatures do not create interference or noise affecting the temperature calculation of the combustion gases. As shown in FIG. 7, the line strength of the absorption at the 133 nm wavelength increases with temperature.

FIG. 6 shows strong absorption line strength at a wavelength of 7243/cm, at ambient temperature (296K) and nominal line strength at a temperature of 2000K. The absorption at the 7243/cm (1380 nm) wavelength varies inversely with temperature.

The temperature dependent line strength [cm-2 atm-1] may be expressed in terms of the known line strength at a reference temperature T0:

$$S(T) = S(T_0)\frac{Q(T_0)}{Q(T)}\left(\frac{T_0}{T}\right)$$
$$\exp\left[-\frac{hcE''}{k}\left(\frac{1}{T} - \frac{1}{T_0}\right)\right]\left[1 - \exp\left(\frac{-hcv_0}{kT}\right)\right]\left[1 - \exp\left(\frac{-hcv_0}{kT_0}\right)\right]^{-1}$$

where Q(T) is the molecular partition function, h[Jsec] is Planck's constant, c [cm/s] is the speed of light, k [J/K] is Boltzmann's constant, and E" [cm-1] is the lower energy state.

The temperature can be inferred from the measured ratio of integrated absorbance for two different temperature dependent transitions.

$$R = \frac{\int P_{abs}L\Phi_{v1}S_1(T)dv}{\int P_{abs}L\Phi_{v2}S_2(T)dv} =$$
$$\frac{S_1(T)}{S_2(T)} = \frac{S(T_0, v_1)}{S(T_0, v_2)}\exp\left[-\left(\frac{hc}{k}\right)(E_1'' - E_2'')\left(\frac{1}{T} - \frac{1}{T_0}\right)\right]$$

where Pabs[atm] is the partial pressure of the absorbing species, φv [cm] is the line-shape function of a particular transition, S(T0,vi) is the line strength of the transition centered at vi [cm-1], for the reference temperature T0, E" is the lower state energy [cm-1] and T is the gas temperature [K].

The relative sensitivity of the above ratio to temperature is obtained by:

$$\sigma = \left|\frac{dR/R}{dT/T}\right| = \left(\frac{hc}{k}\right)\frac{|(E_1'' - E_2'')|}{T}$$

It can be seen from the above equation that a line pair with a high lower state difference is desired to have high temperature sensitivity.

In the example shown in FIGS. 5 and 6, the sensitivity (σ) is 5.71 for a temperature range of 1500K to 2000K (2240° F. to 3140° F.).

A high level of sensitivity indicates that the accuracy of temperature measurements made using the pair of wavelengths 1334 nm and 1380 nm should be approximately 0.35%, which corresponds to an error of only 9 degrees Fahrenheit at 2500 degrees Fahrenheit.

FIG. 7 (which is identical to FIGS. 5) and 8 are exemplary charts showing line strength for laser absorption by combustion gases at various wavelengths. FIG. 7 shows a strong line of absorption at a wavelength of 7495/cm (1334 nm) and a temperature of 2000 Kelvin (K) (1727° C. and 3140.6° F.).

Figure 8:
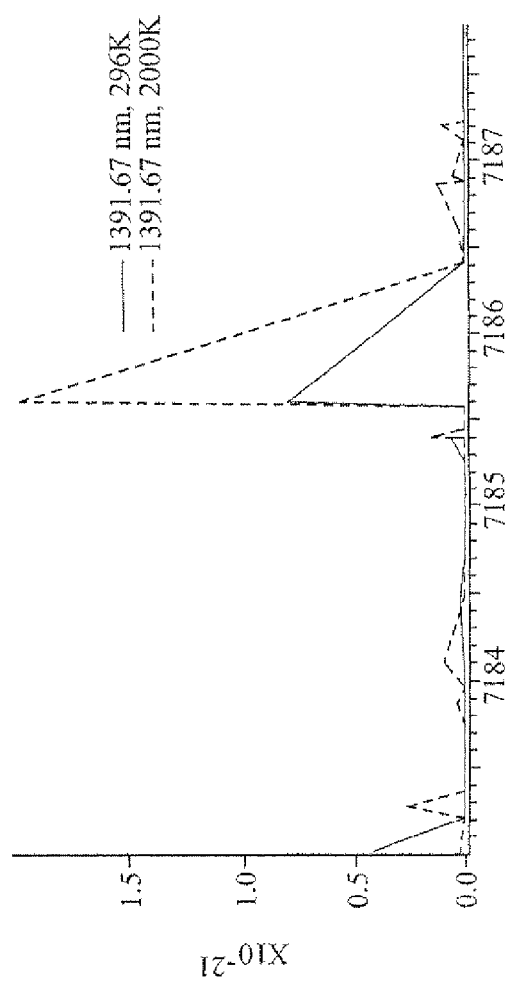

There are no neighboring wavelengths having a line of absorption in the range of 7490/cm to 7515/cm. FIG. 8 shows a strong line of absorption at a wavelength of 7185/cm (1391 nm).

Though there is another line of absorption near 7185 cm-1 in FIG. 8, the line strength of this other line is small. A criterion to ensure the measurement of temperature is that the two transitions have similar signal-to-noise ratio (SNR). Assuming a minimum detectable absorbance of 2E-4 and an SNR of 10, the peak absorbance has to be greater than 2E-3. Assuming a pressure of 15 atm and a path length of 1 cm, the line at 7185 cm-1 (with pressure broadening) in FIG. 8 should not significantly affect the accuracy of temperature measurement.

FIG. 8 shows strong absorption line strength at a wavelength of 7185/cm, (1391 nm) at ambient temperature (296K) and nominal line strength at a temperature of 2000K. The absorption at the 7185/cm (1391 nm) wavelength varies inversely with temperature.

In the example shown in FIGS. 7 and 8, the sensitivity ($\sigma$) is 3.91 for a temperature range of 1500K to 2000K (2240° F. to 3140° F.). This high level of sensitivity indicates that the accuracy of temperature measurements made using the pair of wavelengths 1334 nm and 1391 nm should be within 15 degrees Fahrenheit at 2500 degrees Fahrenheit.

The diode laser in the laser and sensor assembly 22 may be tuned to a third wavelength, e.g., 635 nm, which does not correspond to a wavelength that is absorbed by the combustion gas. The line strength signal detected at the third wavelength may be used as a reference indicative of the transparency of the optics in the laser and sensor assembly 22 and the reflectivity of the turbine shaft or other surface used to reflect the laser beam back to the detector in the tip 32 of the assembly 22.

FIGS. 9 and 10 are a flow chart of an exemplary method for setting up a tunable laser system to measure combustion temperature and measuring combustion temperature. The portion of the method for measuring the combustion temperature may be embodied as instructions in a computer program stored on a non-transitory storage medium accessible by the processor or in the computer 27 shown in FIG. 2.

In step 100, combustion gases that are the same as or substantially similar are tested to identify wavelengths of radiation which are absorbed by the combustion gas, e.g., by species of combustion. The combustion gases may be tested at a low pressure, e.g., one atmosphere (ATM), or at a pressure similar to the compressor discharge pressure, e.g., 20 ATM to 30 ATM. Testing at a low pressure avoids the merging of lines of absorption strength that tends to occur at high pressure. The lines of absorption may be identified in a laboratory combustion chamber. A tunable diode laser may be used to scan a suitable range of wavelengths to obtain the data regarding the wavelengths at which absorption occurs by species in the combustion gases.

In step 102, the data regarding the absorption lines of strength obtained in step 101 are evaluated to identify lines of strength corresponding to species in the combustion gas which undergo temperature related transitions. For example, water vapor and oxygen are species of the combustion gas which undergo temperature related transitions. A person of ordinary skill in the art of combustion, especially combustion gases in a gas turbine, will have sufficient knowledge and training to determine which lines of absorption strength in the data correspond to temperature dependent transitions of species of the combustion gas.

From the lines of strength identified in step 102, find groups, e.g., pairs, of lines of strength associated with the same combustion gas species in step 104. The lines of strength within a group are evaluated, in step 106, to identify a pair of lines in which each line has no neighboring lines of strength. For example, a pair of wavelengths of 1334 nm and 1380 nm, and 1334 nm and 1391 nm have associated strong lines of absorption due to a temperature dependent transition of water vapor and lack neighboring strong lines of absorption.

In step 104, determine which of the lines of strength identified in step 102 are distant from neighboring lines of strength. The pairs of wavelengths corresponding to the lines of strength without neighboring lines of strength identified in step 104, are selected as the pair of wavelengths at which absorption is measured to calculate the temperature of the combustion gas. In step 108, a wavelength is identified that is not associated with a line of strength, particularly a temperature dependent line of strength.

In step 110, the laser and sensor assembly is installed in the gas turbine such that the tunable laser diode radiates a beam through the gas path in the gas turbine. The laser beam may pass through a gap between the first stator and first turbine to collect absorption data directly from the location of the Tfire temperature.

In step 112 and during operation of the gas turbine, the laser and sensor assembly collect absorption data by projecting a laser beam through the gas turbine, wherein the laser is tuned to the wavelengths selected in step 106. The tuning of the laser may be cyclic such that the wavelengths are periodically and quickly changed to the wavelengths selected in steps 106 and 108. The absorption data is collected and stored in a storage medium associated with the controller in the laser and detector assembly. In step 114, the absorption data is processed in the laser and detector assembly or in the controller for to the gas turbine to calculate a combustion gas temperature based on the ratio of the line strengths (absorption data) obtained at the two wavelengths identified in step 106. Further, the laser and detector assembly uses the absorption data collected at the wavelength identified in step 108 as a reference indicating a line of strength signal having no absorption by species of the combustion gas. The controller for the gas turbine uses the calculated combustion gas temperature to control the gas turbine and generate reports regarding the performance of the gas turbine.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combustion gas measurement apparatus mounted in a gas turbine, the measurement apparatus comprising:
   a tunable laser generating a radiation beam passing through a combustion gas path in the gas turbine;
   a controller for the tunable laser and tuning the laser to emit radiation having at least a first selected wavelength and a second selected wavelength which both correspond to temperature-dependent transitions of a combustion species of the gas, wherein the first selected wavelength and the second selected wavelength lack neighboring wavelengths corresponding to lines of absorption strength;
   a detector sensing the radiation beam passing through the combustion gas and generating absorption signals indicative of an absorption of the beam by the combustion gas at each of the first wavelength and the second wavelength, and a processor executing a program stored on a non-transitory storage medium determining a combustion gas temperature based on a ratio of the absorption signals for the first wavelength and the second wavelength.

2. The combustion gas measurement apparatus of claim 1, wherein the first selected wavelength is 1334 nanometers (nm) and the second selected wavelength is 1380 nm or 1391 nm.

3. The combustion gas measurement apparatus of claim 1, wherein the combustion species is water vapor.

4. The combustion gas measurement apparatus of claim 1, wherein the tunable laser is mounted in the gas turbine such that the radiation beam passes through the gas path between a first turbine stator and a first turbine bucket of the gas turbine.

5. The combustion gas measurement apparatus of claim 1, wherein the tunable laser is a tunable diode laser.

6. The combustion gas measurement apparatus of claim 1, wherein the radiation beam is reflected from a surface of a turbine of the gas turbine.

7. A combustion gas measurement apparatus mounted in a gas turbine, the measurement apparatus comprising:
a tunable diode laser emitting a laser beam passing through a combustion gas path in the gas turbine;
the tunable diode laser tuned to emit a first laser beam at a wavelength of 1334 nanometers (nm) and a second laser beam at a wavelength of 1380 nm or 1391 nm;
a laser sensor sensing the first laser beam and the second laser beam, each beam passing through the combustion gas, and the sensor generating a first absorption signal indicative of an absorption of the first laser beam by the combustion gas and a second absorption signal indicative of an absorption of the second laser beam by the combustion gas, and
a processor executing a program stored on a non-transitory storage medium determining a combustion gas temperature based on a ratio of the first and second absorption signals for the first laser beam and the second laser beam.

8. The combustion gas measurement apparatus of claim 7, wherein the tunable diode laser is mounted in the gas turbine such that the laser beams pass through the gas path between a first turbine stator and a first turbine bucket of the gas turbine.

9. The combustion gas measurement apparatus of claim 7, wherein the radiation beam is reflected from a surface of a turbine of the gas turbine.

\* \* \* \* \*